United States Patent
Weinberg

(10) Patent No.: US 8,788,267 B2
(45) Date of Patent: Jul. 22, 2014

(54) MULTI-PURPOSE CONTEXTUAL CONTROL

(75) Inventor: Garrett L. Weinberg, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 1086 days.

(21) Appl. No.: 12/557,010

(22) Filed: Sep. 10, 2009

(65) Prior Publication Data

US 2011/0060589 A1 Mar. 10, 2011

(51) Int. Cl.
*G10L 15/04* (2013.01)

(52) U.S. Cl.
USPC ........... 704/251; 704/231; 704/235; 704/270; 704/270.1; 704/275

(58) Field of Classification Search
USPC ............... 704/251, 231, 235, 270, 270.1, 275
See application file for complete search history.

(56) References Cited

U.S. PATENT DOCUMENTS

| | | | |
|---|---|---|---|
| 4,989,253 A | 1/1991 | Liang | |
| 5,970,457 A | 10/1999 | Brant | |
| 6,230,138 B1 | 5/2001 | Everhart | |
| 7,219,123 B1 * | 5/2007 | Fiechter et al. | 709/203 |
| 7,542,966 B2 | 6/2009 | Wolf | |
| 2003/0069733 A1 * | 4/2003 | Chang | 704/275 |
| 2005/0009604 A1 * | 1/2005 | Huang | 463/36 |

FOREIGN PATENT DOCUMENTS

| | | |
|---|---|---|
| CN | 2862265 Y | 1/2007 |
| CN | 200680048127.4 | 1/2009 |

OTHER PUBLICATIONS

Perenson M. J.: "Apple iPhone 3GS Reviewed," Jun. 23, 2009 Retrieved from the InternetL URL:http://www.pcworld.com/reviews/product/116744/review/32gb_iphone_3gs.html.
Weinberg G: "Context Push-to-Talk: A New Technique for Reducing Voice Dialog Duration," Proceedings of the 11th International Conference on Human-Computer Interation with Mobile Devices and Services, Sep. 15, 2009, XP002610087.

* cited by examiner

*Primary Examiner* — Qi Han
(74) *Attorney, Agent, or Firm* — Dirk Brinkman; Gene Vinokur

(57) ABSTRACT

A method and a system for activating functions including a first function and a second function, wherein the system is embedded in an apparatus, are disclosed. The system includes a control configured to be activated by a plurality of activation styles, wherein the control generates a signal indicative of a particular activation style from multiple activation styles; and controller configured to activate either the first function or the second function based on the particular activation style, wherein the first function is configured to be executed based only on the activation style, and wherein the second function is further configured to be executed based on a speech input.

5 Claims, 4 Drawing Sheets

300

MULTI-PURPOSE CONTEXTUAL CONTROL

RELATED APPLICATION

This application is related to U.S. patent application Ser. No. 12/557,035 filed Sep. 10, 2009, entitled "Method and System for Automatic Speech Recognition with Multiple Contexts" co-filed herewith by Weinberg, and incorporated herein by reference.

FIELD OF THE INVENTION

The present invention relates generally to automatic speech recognition, and more particularly to automatic speech recognition for a particular context.

BACKGROUND OF THE INVENTION

Automatic Speech Recognition (ASR)

The object of automatic speech recognition is to acquire an acoustic signal representative of speech, i.e., speech signals, and determine the words that were spoken by pattern matching. Speech recognizers typically have a set of stored acoustic and language models represented as patterns in a computer database. These models are then compared to the acquired signals. The contents of the computer database, how the database is trained, and the techniques used to determine the best match are distinguishing features of different types of speech recognition systems.

Various speech recognition methods are known. Segmental models methods assume that there are distinct phonetic units, e.g., phonemes, in spoken language that can be characterized by a set of properties in the speech signal over time. Input speech signals are segmented into discrete sections in which the acoustic properties represent one or more phonetic units and labels are attached to these regions according to these properties. A valid vocabulary word, consistent with the constraints of the speech recognition task, is then determined from the sequence of assigned phonetic labels.

Template-based methods use the speech patterns directly without explicit feature determination and segmentation. A template-based speech recognition system is initially trained using known speech patterns. During recognition, unknown speech signals are compared with each possible pattern acquired during the training and classified according to how well the unknown patterns match the known patterns.

Hybrid methods combine certain features of the above-mentioned segmental model and template-based methods. In certain systems more than just acoustic information is used in the recognition process. Also, neural networks have been used for speech recognition. For example, in one such network, a pattern classifier detects the acoustic feature vectors and convolves vectors with filters matched to the acoustic features and sums up the results over time.

ASR Enabled Systems

ASR enabled systems include two major categories, i.e., information retrieval (IR) systems, and command and control (CC) systems.

Information Retrieval (IR)

In general, the information retrieval (IR) system searches content stored in a database based on a spoken query. The content can include any type of multimedia content such as, but not limited to, text, images, audio and video. The query includes key words or phrases. Many IR systems allow the user to specify additional constraints to be applied during the search. For instance, a constraint can specify that all returned content has a range of attributes. Typically, the query and the constraints are specified as text.

For some applications, textual input and output is difficult, if not impossible. These applications include, for example, searching a database while operating a machine, or a vehicle, or applications with a limited-functionality keyboard or display, such as a telephone. For such applications, ASR enabled IR systems are preferred.

An example of the ASR enabled IR system is described in U.S. Pat. No. 7,542,966, "Method and system for retrieving documents with spoken queries," issued to Wolf et al. on Jun. 2, 2009.

Command and Control (CC)

ASR enabled CC systems recognize and interpret spoken commands into machine understandable commands. Non limited examples of the spoken commands are "call" a specified telephone number, or "play" a specified song. A number of the ASR enabled CC systems have been developed due to recent advancements in speech recognition software. Typically, those systems operate in particular environment using a particular context for the spoken commands.

Contextual ASR Enabled Systems

Large vocabularies and complex language models slow the ASR enabled systems, and require more resources, such as memory and processing. Large vocabularies can also reduce an accuracy of the systems. Therefore, most ASR enabled systems have small vocabularies and simple language models typically associated with a relevant context. For example, U.S. Pat. No. 4,989,253 discloses an ASR enabled system for moving and focusing a microscope. That system uses the context associated with microscopes. Also, U.S. Pat. No. 5,970,457 discloses an ASR enabled system for operating medical equipment, such as surgical tools, in accordance with the spoken commands associated with appropriate context.

However, a number of the ASR enabled systems need to include multiple vocabularies and language models useful for different contexts. Such systems are usually configured to activate appropriate vocabulary and language model based on a particular context of interest selected by a user.

As defined herein, the context of the ASR enabled system is, but not limited to, a vocabulary, language model, a grammar, domain, database, and/or subsystem with related contextual functionality. For example, the functionalities related to music, contacts, restaurants, or points of historical interest would each have separate and distinguishable contexts. The ASR enabled system that utilizes multiple contexts is a contextual ASR enabled system.

Accordingly, for the contextual ASR enabled systems, it is necessary to specify the context for the spoken queries or the spoken commands.

ASR Enabled Systems Employing PTT Functionality

There are different types of ASR systems that distinguish intended speech input from background noise, or background speech. Always-listening systems employ a lexical analysis of the recognized audio signal to detect keywords, e.g., "computer," which are intended to activate the ASR enabled systems for further input.

Another type of the ASR enabled system makes use of other input clues modeled after human-to-human discourse, such as direction of gaze.

Yet another type of ASR system uses push-to-talk (PTT) functionality. A PTT control, e.g., a button, is used to mark the beginning of a stream of audio signal as intended speech input. In some implementations, the end of the speech input is determined automatically by analyzing, for example, the amplitude or signal-to-noise ratio (SNR) of the acquired signal. In other implementations, the user is required to keep the button depressed until the user is finished speaking, with the release of the button explicitly marking the end of the input signal.

Embedded ASR Systems

Sometimes, it is necessary to embed the ASR enabled system directly in a physical device rather than to implement the ASR enabled system on network-based computing resources. Scenarios where such embedding may be necessary include those where persistent network connection cannot be assumed. In those scenarios, even if the ASR enabled system involves updating databases on network computers, it is necessary to obtain information through human-machine interaction conducted independently on the device. Then, after the network communication channel is restored, the updated information collected on the device can be synchronized with the network-based database.

As defined herein, an embedded ASR system is one in which all speech signal processing necessary to perform CC or IR takes place on a device, typically having an attached wired or wireless microphone. Some of the data required to generate, modify, or activate the embedded ASR system can be downloaded from different devices via wired or wireless data channels. However, at the time of ASR processing, all data resides in a memory associated with the device.

As described above, it is advantageous to use different types of ASR systems such as IR and CC systems in conjunction with a particular context or a plurality of contexts. Also, due to their limited memory and CPU resources, some embedded ASR systems have limitations which do not necessarily apply to desktop or server-based ASR systems. For example, desktop or server-based systems might be able to process a music-retrieval instruction, such as searching for a particular artist, from any state of the system. However, the embedded ASR system, e.g., an ASR system in a vehicle, might require the user to switch to an appropriate contextual state first, and would allow the user to provide the speech input relevant only to that particular contextual state.

Typically, the embedded ASR system is associated with multiple different contexts. For example, music can be one context. While the embedded ASR system is in the music context state, the system expects user speech input to be relevant to music, and the system is configured to execute functions only relevant to retrieving music. Navigation and contact are other non limited examples of the context of the ASR system.

For example, in the embedded ASR system with user interface employing a PTT button, to search for a musical performer, the user has to push the PTT button, pronounce a contextual instruction, e.g., a code word such as "music," to switch the ASR system into a music contextual state. After speaking the code word, the user can input a spoken instruction for the music retrieval. If the user inputs music-related spoken instructions, while in some other contextual state, the ASR system fails.

FIG. 1 shows a conventional embedded ASR system. After a PTT button 105 is pressed, the system is expecting speech input containing contextual instructions 110-112. After recognizing 120 the contextual instruction, the system transitions to an appropriate contextual state 130-132. Accordingly, the system after recognizing a subsequent speech input 133-135 activates appropriate function 136-138.

However, complex tasks, such as music retrieval and destination entry, interfere with other user operations, e.g., driving a vehicle, especially when durations of the tasks increase. Hence, it is often desired to reduce a number of steps to activate a function with speech input in the embedded ASR system.

SUMMARY OF THE INVENTION

A method and a system for activating functions including a first function and a second function, wherein the system is embedded in an apparatus, are disclosed. In one embodiment, the system includes a control configured to be activated by multiple activation styles, wherein the control generates a signal indicative of a particular activation style from the plurality of activation styles; and a controller configured to activate either the first function or the second function based on the particular activation style, wherein the first function is configured to be executed based only on the activation style, and wherein the second function is further configured to be executed based on a speech input.

Alternative embodiment describes the method for activating a first function and a second function, comprising the steps of providing a control configured to be activated by multiple activation styles, wherein the control generates a signal indicative of a particular activation style from the plurality of activation styles; activating either the first function or the second function based on the particular activation style, wherein the first function is configured to be executed based only on the activation style, and wherein the second function is further configured to be executed based on a speech input; and executing either the first function or the second function.

DETAILED DESCRIPTION OF THE PREFERRED EMBODIMENT

Contextual PTT Controls

Embodiments of the invention are based on a realization that multiple dedicated contextual push-to-talk (PTT) controls facilitate an activation of appropriate functions in embedded automatic speech recognition (ASR) systems.

Figure 1:
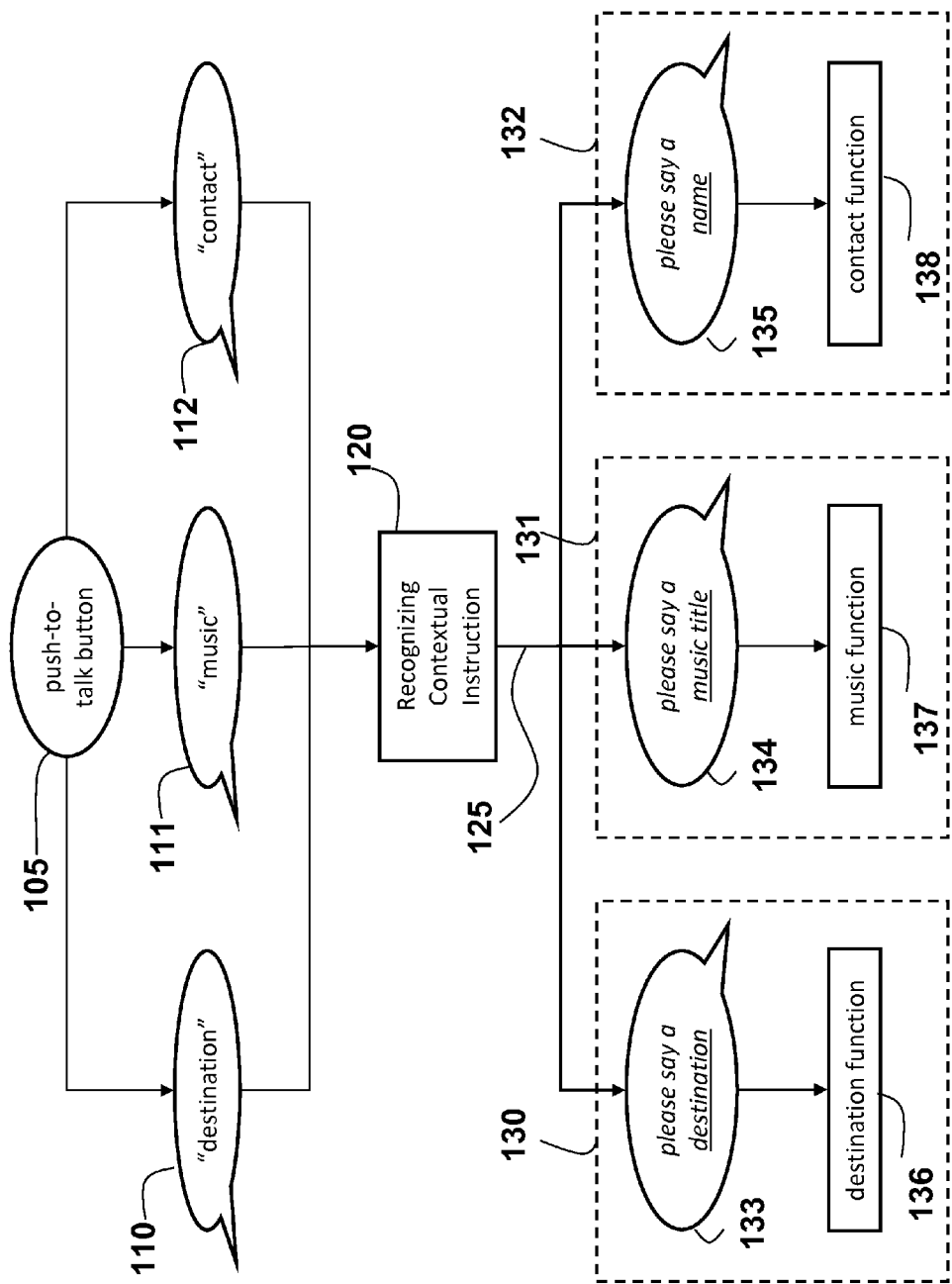
FIG. 1 is a block diagram of a conventional automatic speech recognition system.
Figure 2:
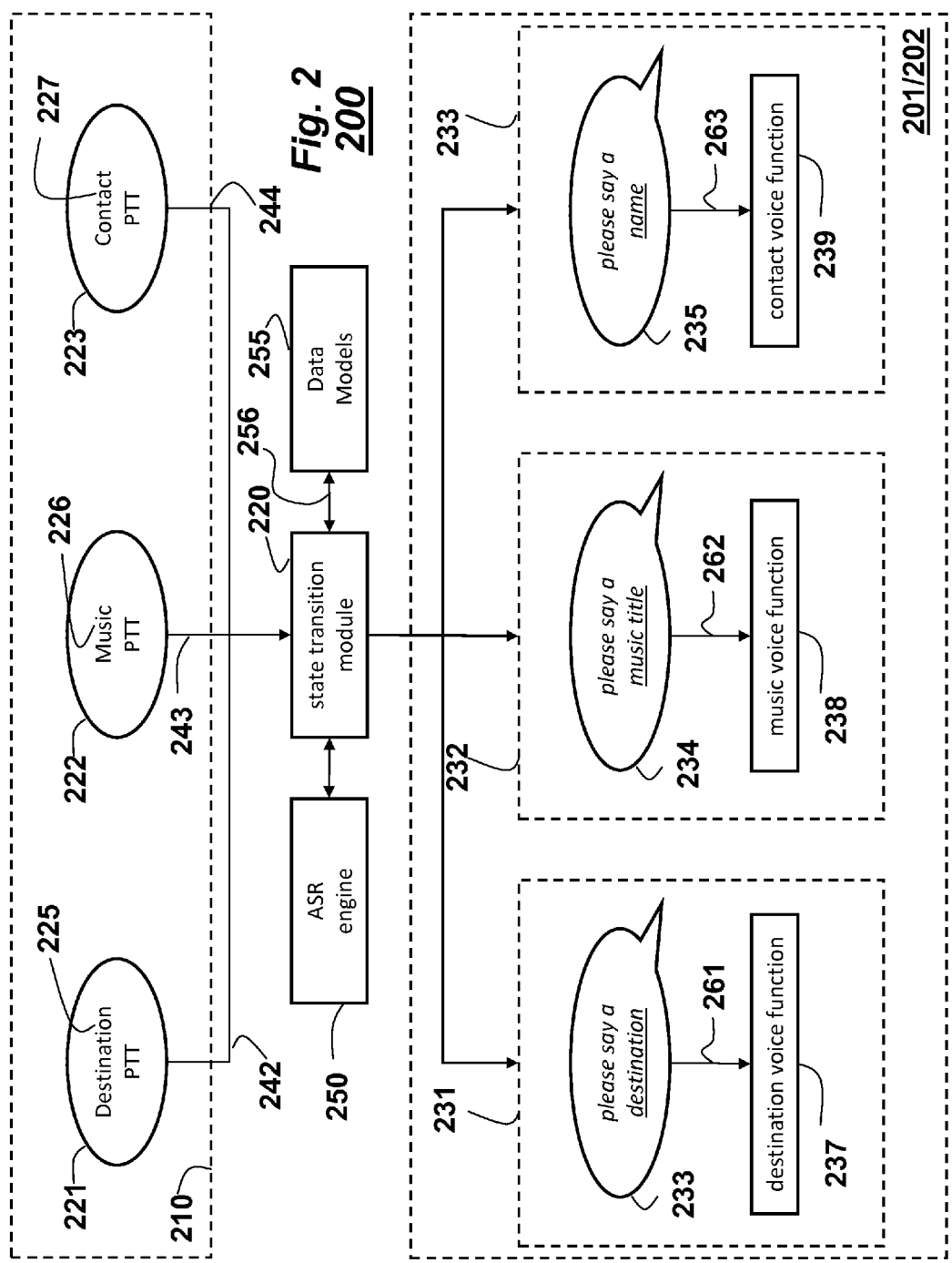
FIGS. 2-3 are block diagrams of an embedded automatic speech recognition methods and systems according different embodiments of the invention.

FIG. 2 shows the embedded ASR system according one embodiment of the invention. The system includes a processor 201, which includes a memory 202, input/output interfaces, and signal processors as known in the art.

The system 200 includes multiple states 231-233 stored in the memory 202. Typically, each state is associated with a particular context. For example, one state is associated with music context, and another state is associated with contact context. Each state is also associated with at least one function of functions 237-239. The functions 237-239 are configured to be activated based on speech inputs 233-235. Typically the functions are associated with the state in a manner similar to the association of the context with the state. For example, functions configured to select and play music are associated with the state associated with the music context. But functions configured to select and call to a particular phone number, are associated with the state associated with the contact context.

Typically, the speech input includes an identifier of the function and a parameter of the function to be executed. For example, the speech input is "Call Joe." The identifier of the function is "Call" part of the input. Based on the identifier the function for executing telephone calls is selected from the multiple functions associated with the "telephone" state. The "Joe" part of the speech input is the parameter to the function selected based on the identifier. Accordingly, the system executes selected function using the parameter, i.e., call to a telephone number selected form a phonebook based on the name "Joe."

The system 200 is configured to activate a function associated with the state, only when the system is transitioned into that state. For example, in order to activate a music function, the system has to be first transitioned into the state associated with the music function, and, accordingly, associated with the music context.

Instead of having one conventional PTT button, the system 200 provides a control panel 210, which includes multiple controls 221-223, e.g., contextual PTT controls. Each contextual PTT control can be any input control configured to be activated tangibly, such as a button, a joystick, or a touch-sensitive surface.

Each contextual PTT control 221-223 has one to one correspondence with the states 231-233. Upon activation, the contextual PTT controls generate signals 242-244. The signal can be any type of signal, e.g., a binary signal, which carries information about activated contextual PTT control.

A state transition module 220, upon receiving the signal, transitions the system 200 into the state associated with the signal to activate the function. For example, in one embodiment, the transition into the state is accomplished by associating a data model 256 from a set of data models 255 with an ASR engine 250. The data model includes a vocabulary, and/or a set of predetermined commands or search terms, which allows the ASR engine to interpret the speech inputs. The ASR engine interprets the speech inputs 233-235 into inputs 261-263 expected by the functions 237-239. Accordingly, if the data model 256 includes vocabulary of, e.g., music context, then the ASR engine can interpret only music related speech input 234. Alternatively or additionally, the state transition module preselects, e.g., upload into memory of processor 201, the functions included into the corresponding state.

The embodiments provide significant advantages over conventional systems with a single PTT button. The conventional systems require additional speech input to transition into a particular state. However, the embodiments of the invention directly transition the system into the state associated with the control based on the activation of that control.

Hence, the system 200, in contrast with conventional systems, takes advantage of muscle memory, which is enhanced by repeated similar movements, similar to touch typing and gear shifting. Therefore, the controls are arranged so the user can active the controls with minimal distraction from primary tasks, e.g., driving a vehicle.

In one embodiment, each control conveys an identifier 225-227 of the context associated with the state. For example, the identifier can have a caption rendered on the control with a name of the context such as "call," or "music." Additionally or alternatively, the identifier can be a color of the control, a shape of the control, a location of the control on the device, and a combination thereof. This embodiment reduces training time usually required for a human operator to learn how to operate the ASR embedded system.

Figure 4:
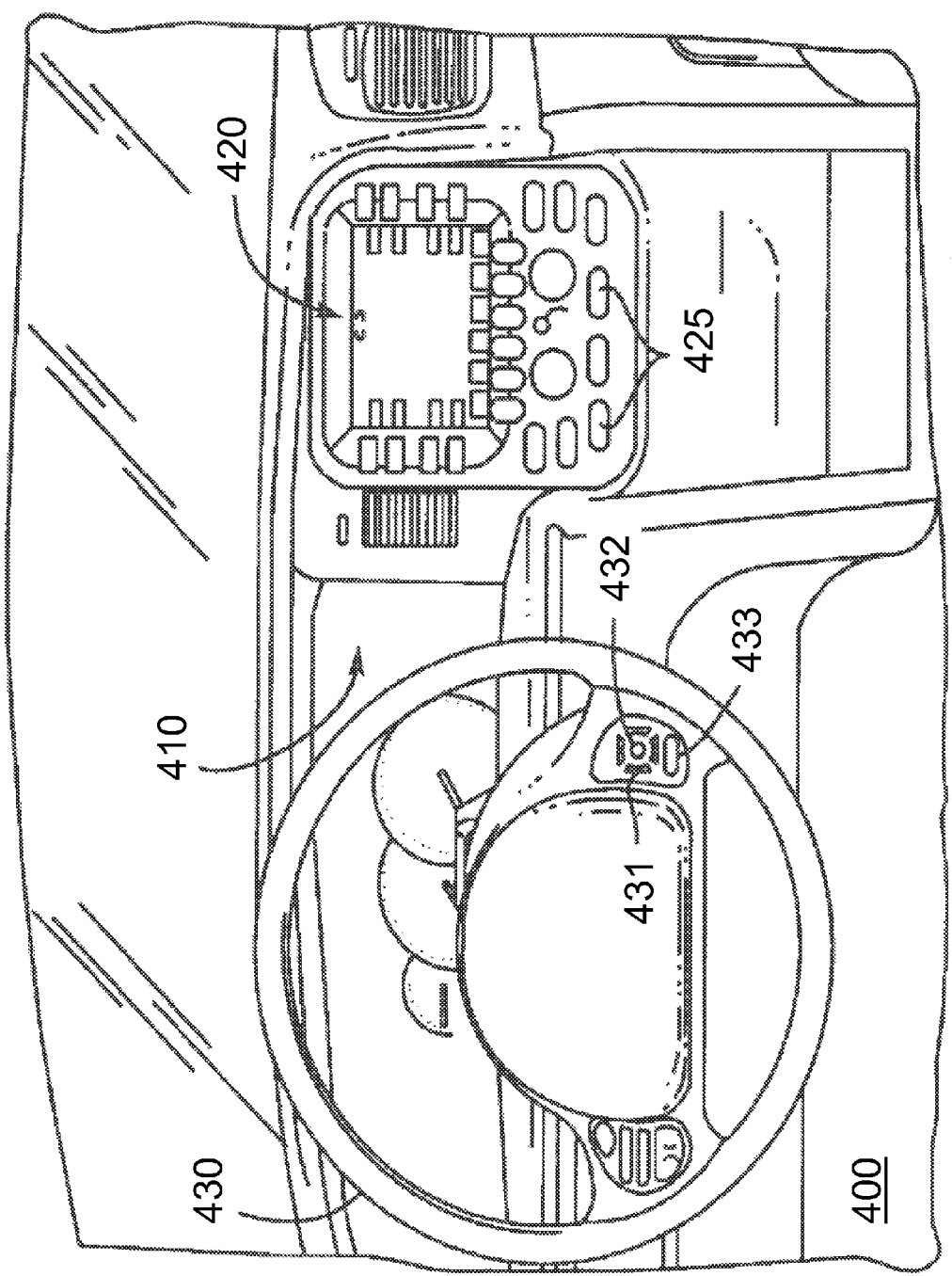
FIG. 4 is a partial front view of an instrumental panel of a vehicle including the system according some embodiments of the invention.

As shown in FIG. 4, the system 200 can be embedded in an instrumental panel 410 of a vehicle 400. Contextual PTT controls 432-433 can be arranged on a steering wheel 430. Alternatively or additionally, contextual PTT controls 425 can be place on a control module 420. The multiple contextual PTT controls simplify the search, and require less user interaction so that the user can concentrate on operating the vehicle.

Multi-Purpose Control

Figure 3:
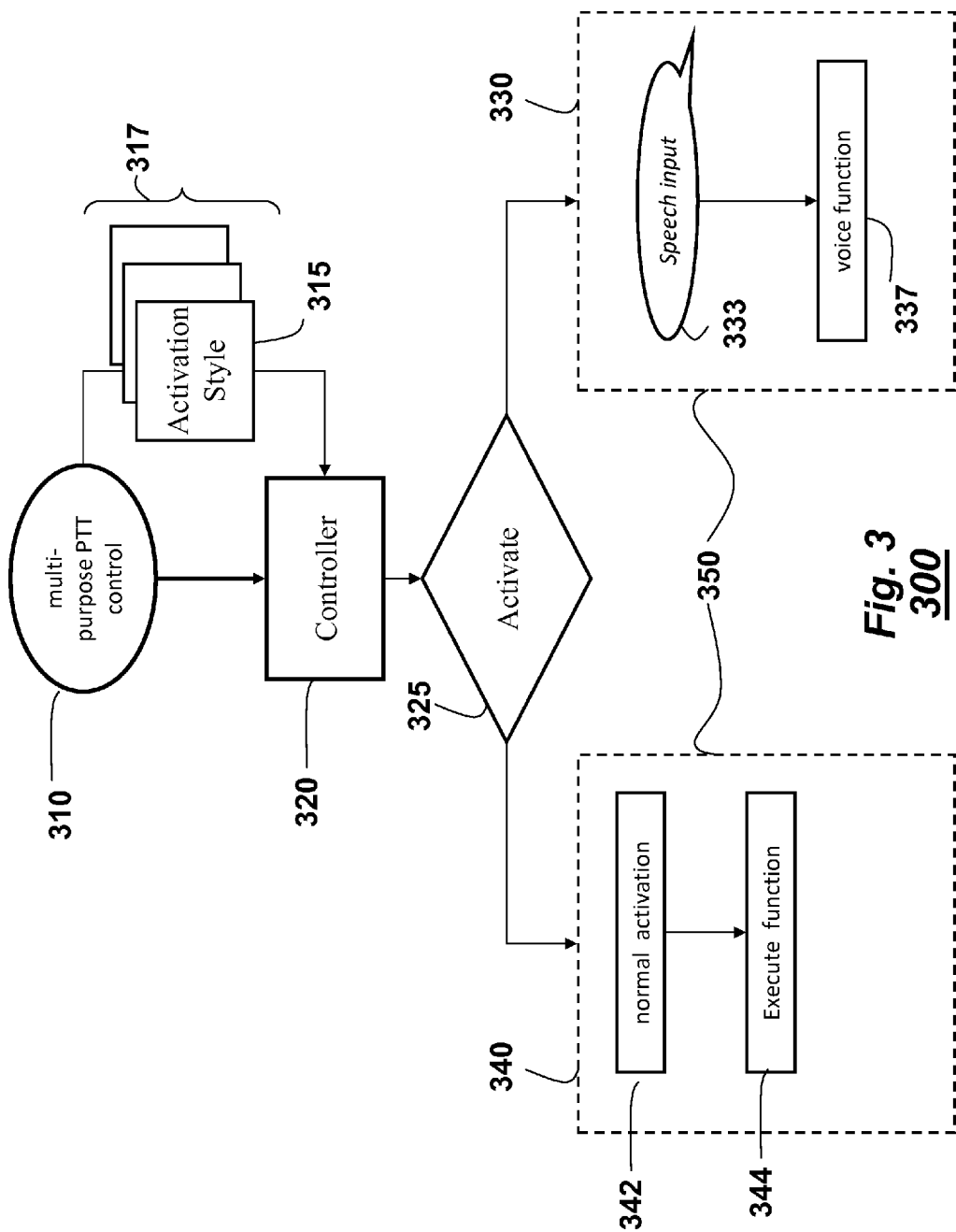

FIG. 3 shows a block diagram of a system and method 300 according to another embodiment of the invention. In this embodiment, a control 310 is a multi-purpose PTT control connected via a controller 320 to at least functions 330 and 340. The control 310 is configured to generate a signal indicative of a particular actuation style 315 selected from multiple actuation styles 317. The actuation styles include, e.g., a single click, a double click, and press and hold activation styles.

The controller 320 activates 325 either a first function 340 or a second function 340 based on the particular actuation style 315. The main difference between the functions 330 and 340, is that the first function 340 can be activated based only on the actuation style 315. However, the second function 330 requires a speech-enabled actuation, i.e., is further configured to expect speech input 333.

This embodiment enables utilization of any conventional control as the multi-purpose PTT control. If the user activates the control in a "normal" activation style, e.g., single click, then the system activates 342 and execute 344 the first function. Otherwise, the user activates the control with a "special" activation style, e.g. double click, invoking function 337 which expects the speech input 333.

For example, a single click on a green call button on a telephone displays recent calls. However, a double click on the same green call button causes the system to detect speech input, e.g., a phonebook search like "John Doe", and execute a "call" function according to the speech input. In this example, the function 340 is the function that displays the recent calls. As readily understood, the function 340 does not need any additional input when activated with the single click activation style. On another hand, the function that calls to a particular phone number is the function 330, which requires an additional input, e.g., a name of a contact from the phonebook. In this embodiment, this additional input is interpreted by the embedded ASR system based on the speech input.

Similarly, "play/pause" and "shuffle" buttons on a radio can accept speech input. If the normal actuation acts as a simple toggle operation, i.e., play or pause, random playback on or off, the speech-enabled actuation detects speech input for the operation, i.e., play what, or shuffle what.

In one embodiment, implementation of the speech-enabled activation of the function 330 is similar to implementation of the states of the system 200. When the user instructs the system 300 to activate the first function 330, the system 300 is transitioned into a state associated with the first function 330, similar to the states 231-233.

In another embodiment, the systems 200 and 300 are combined providing multiple multi-purpose contextual PTT controls. In this embodiment, the control panel 210 includes multiple multi-purpose PTT controls. This embodiment allows for embedding the ASR system in a device having conventional buttons turning the device into multi-purpose contextual ASR embedded system.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

I claim:

1. A system for activating a plurality of functions based on speech input, wherein the system is embedded in an apparatus, comprising:
   a memory storing a plurality of states, wherein each state is associated with at least one function from the plurality of functions and a data model from a set of data models;
   an automatic speech recognition (ASR) engine for interpreting, based on the data model, the speech input into a functional input for activating the function;
   a plurality of controls, wherein there is one control for each state forming one-to-one correspondence between a control and a state, and wherein the control, upon activation, generates a signal associated with the state;
   a state transition module for transitioning the system to the state based on the signal, such that the system interprets the speech input using only the data model associated with the state, and execute the function associated with the state according to the functional input; and
   a processor operatively connected to the memory for executing the ASR engine and the state transition module.

2. The system of claim 1, wherein the speech input includes a parameter, such that the function is executed based on the parameter.

3. The system of claim 1, wherein the control is a push-to-talk button.

4. The system of claim 1, wherein the apparatus is an instrumental panel of a vehicle.

5. The system of claim 1, wherein the apparatus includes a telephone, a musical player, and a navigation device.

* * * * *